United States Patent [19]

Kuzumoto et al.

[11] 4,430,219
[45] Feb. 7, 1984

[54] HOLLOW FIBER PACKAGE BODY AND ITS PRODUCTION

[75] Inventors: Hideshi Kuzumoto; Tutomu Tanaka; Hiroshi Matsumoto, all of Otsu, Japan

[73] Assignee: Tayo Boseki Kabushiki Kaisha, Japan

[21] Appl. No.: 391,771

[22] Filed: Jun. 24, 1982

Related U.S. Application Data

[63] Continuation of Ser. No. 170,218, Jul. 18, 1980, abandoned, which is a continuation of Ser. No. 1,043, Jan. 4, 1979, abandoned.

[30] Foreign Application Priority Data

Jan. 10, 1978 [JP] Japan .................................. 53-1775

[51] Int. Cl.³ .................. B01D 39/00; D02G 3/00
[52] U.S. Cl. .................. 210/321.3; 210/500.2; 428/376; 428/377; 428/398
[58] Field of Search .................. 428/376, 377, 398; 210/500.2, 321.1, 321.2, 321.3, 646; 156/172

[56] References Cited

U.S. PATENT DOCUMENTS

| 3,755,034 | 8/1973 | Mahon | 156/169 |
| 3,794,468 | 2/1974 | Leonard | 210/321.1 X |
| 4,187,180 | 2/1980 | Joh | 210/321.1 |

Primary Examiner—Lorraine T. Kendell
Attorney, Agent, or Firm—Jones, Tullar & Cooper

[57] ABSTRACT

A hollow fiber package body for separation of fluid comprising a core and layers of hollow fibers having a selective permeability to fluid arranged around said core, said hollow fiber layers being formed by tape-like bundles of hollow fibers and composed of the arrangement of hollow fibers in nearly parallel relations one another and in a flat state, and said hollow fiber bundles being arranged in multi-layers by intersecting at least at a spot between one end and the other end of said package body.

8 Claims, 8 Drawing Figures

HOLLOW FIBER PACKAGE BODY AND ITS PRODUCTION

This is a continuation of application Ser. No. 170,218, filed July 18, 1980, now abandoned, which in turn is a continuation of application Ser. No. 1,043, filed Jan. 4, 1979, now abandoned.

The present invention relates to a hollow fiber package body and its production. More particularly, it relates to a hollow fiber package body made by arranging hollow fibers having a selective permeability around a core pipe or tube in nearly parallel relations one another to form flat bundles of hollow fibers, and to methods for its production.

A membrane separation process is an operation which separates at least one component from a fluid mixture comprising various components by the use of a membrane having a selectively permeability to fluid. The fields to which said process is applicable include gas permeation, liquid permeation, dialysis, ultrafiltration, reverse osmosis, etc. Specific application examples of the process are conversion of sea water into fresh water, desalting of saline water, purification of waste water, condensing of fruit juice, refining of protein, separation of oil from water, artificial kidney, artificial lung, etc. The membrane is used in the form of film, tube, hollow fiber or the like. Especially, a hollow fiber is advantageous in having a large membrane area per unit volume and good separation efficiency. When, however, a fine hollow fiber is used, any error in assembly or designing will result in loss of the said advantages inherent to the hollow fiber.

There have hitherto been made many proposals on permeation separation apparatuses utilizing hollow fibers, of which an example is an apparatus as disclosed in Japanese Patent Publication (examined) No. 28625/1964 which comprises a cylindrical container and bundles of hollow fibers accommodated therein in parallel to the axial direction. The hollow fibers are arranged in parallel with one another and come into mutual contact to cause a decrease of the effective membrane area. Additionally, because the direction of flow of the fluid and the direction of arrangement of the hollow fibers are in parallel relations to each other, the flow of the fluid is apt to become irregular because of the localized development of portions where the flow rate is extraordinarily small, leading to a lowering of the permeation capacity of the apparatus by a concentration polarization phenomenon.

Another example is an apparatus as disclosed in Japanese Patent Publication (examined) No. 5153/1975 wherein hollow fibers are spirally wound around a core tube to form a layer of hollow fibers, with provision of a pressure resisting wall at the end of the hollow fiber layer. This membrane separation element is desirable as it easily permits mechanization and automation of assembly process. However, in said element, arrangements of the hollow fibers around the core tube are uneven, and a sufficiently high packing density of fibers is difficult to achieve. In said system, on winding the hollow fiber bundles around the core tube, spaces are formed between the bundles, and especially vacant spaces are formed at the intersecting part of the fibers. Thus, when fluid is radially supplied from the core tube to the hollow fiber layers, fluid passes straight through said spaces, and further, due to the uneven densities of packing of the hollow fibers in the hollow fiber layers, the flow of the fluid in the hollow fiber layers shows channeling; the amount of permeation of the fluid is small; and the separation rate of the solute is inferior. Moreover, said construction has a defect in that, because the hollow fibers are wound spirally in many turns, the distance between the open ends of a hollow fiber becomes larger so that the permeation flow produces a considerable pressure loss inside the hollow fibers. Generally, the distance between the open ends of a hollow fiber is limited by the pressure loss of the fluid which flows in the hollow fiber. For example, in the case of its application to a reverse osmosis process, an extension of the length of the hollow fibers beyond a certain limit may provide scarce increase of the permeation capacity of the fluid. Accordingly, when the length of the hollow fiber is restricted, the axial length of the resulting membrane separation element inevitably requires to be made small so that the capacity of such element is reduced.

According to the present invention, there is provided a hollow fiber package body for separation of fluid comprising a core and the layers of the hollow fibers having a selective permeability arranged around the circumferential surface thereof, said hollow fiber layers being formed by the tape-like bundles of the hollow fibers composed of the arrangements of the hollow fibers in nearly parallel relations one another, and said hollow fiber bundles being arranged in multi-layers by intersecting at least at one place.

The package body of the present invention may be provided with a resin wall(s) at one or both end(s) thereof vertically to the axial direction of the package body, the hollow fibers being disposed to be open outward thrusting through at least one of said resin walls, to make a membrane separation element.

The package body of the invention is formed as tape-like hollow fiber bundles comprising plural hollow fibers arranged in mutually and up- and downwardly intersecting relations and multi-layers on the core. Because of this construction, a bundles of the hollow fibers are arranged in multi-layers uniformly and regularly and the hollow fibers are arranged uniformly and at a high density over the whole layers of the hollow fibers without forming vacant spaces at the intersecting parts. Since the intersection is held with the flat central part of the tape-form bundles of hollow fibers on the upper and lower layers, the fluid which is passed through the hollow fiber layer in a direction vertical to the axial direction of the core flows uniformly over the whole areas of the hollow fiber without causing straight escape at the intersection. Thus, the membrane areas of the hollow fibers are effectively utilized producing a high permeation performance and a high separation performance.

Due to the extremely uniform and dense arrangements of the hollow fibers, a resin injected into either one end or both ends of the hollow fiber package body can be uniformly supplied over the whole layers at the end part of the hollow fiber layers so that the space between the resin wall thus formed and the hollow fibers is fully sealed against the fluid. This seal serves to divide each other the flow routes respectively for the fluid having a large concentration and the fluid having a small concentration which are separated by the hollow fiber membrane and performs an important role on the membrane separation. Since the resin is fully filled in the spaces among the hollow fibers at the sealing portion, the seal is quite resistant even to an extremely high operating pressure.

The most desirable embodiment of the invention is a package body wherein the flat bundles of the hollow fibers are arranged and multi-layered around the core in intersection at an angle of intersection of 10° to 90° taken in an axial direction of the core. In such package body, the fibers are arranged in nearly parallel relations with the core, so that, when the hollow fibers are open-ended by cutting at the ends of the package body, the distance between the open ends can be shortened, and accordingly, in treating a fluid, the pressure loss of the permeating fluid in the hollow fibers can be reduced so that a drastic increase of the permeation rate is realized. Additionally, because the hollow fibers, being wound with a certain degree of spiral turn, are arranged under the state of holding one another, the adjacent hollow fibers are prevented from causing mutual contact or fluctuation in position.

When the angle of intersection of the hollow fibers is set in the range of 10° to 90°, the effect of flattening the hollow fiber bundles is obtained to the maximum extent. Supposing the case where the angle of intersection of the hollow fiber bundles is reduced to shorten the span of the hollow fibers on the core, the narrower the angle of intersection is, the larger the space in the vicinity of the intersecting part becomes, and the packing density is lessened. Such a constitution cannot allow uniform flow over the whole hollow fiber layers of the fluid. Even when the length is shortened and the pressure loss in the hollow fibers is reduced, unless the fluid passing outside the hollow fibers shows uniform flow, the amount of permeation of fluid cannot be increased and hence the effect of shortening the hollow fiber cannot be displayed. Only when the angle of intersection is reduced and the hollow fiber bundles are arranged in flat form, such effects can be displayed that the fluid flows uniformly from the core to the hollow fiber layers, the pressure loss inside the hollow fiber is small, and the high liquid permeation rate and the high solute rejection rate are obtained with assurance.

In the present invention, the hollow fibers are arranged around the core as tape-like bundles in nearly parallel relations one another in a flat form. When the outside diameter of a piece of hollow fiber is taken as d, the width of the bundle of the hollow fibers is preferably from 15 to 50,000d, more preferably from 30 to 5,000d. Further, the ratio of thickness/width of the bundle of hollow fibers is preferably from 1/20,000 to 1/5, more preferably from 1/10,000 to 1/10. When the width of the bundle of hollow fibers is less than 15d or the ratio of thickness/width of the bundle of hollow fibers is more than 1/5, flatness of the bundles of hollow fibers is lowered to provide a trend to cause straight escape of the fluid at the intersection of the bundles of hollow fibers and to cause channeling of the fluid in the hollow fiber layers. When the width of the bundle of hollow fibers becomes larger than 50,000d or the ratio of thickness/width is less than 1/10,000, not only the wasting of the hollow fibers at the end part becomes large in preparing the membrane separation element by cutting the end part of the package body but also the fixing of the multi-layered hollow fiber layers becomes insufficient and the fibers are liable to move during the operation of the separating device and the fibers becomes liable to be moved from the original site of arrangement.

For preparation of the hollow fiber package body of the present invention, for instance, a single or plural hollow fibers are arranged as a set, and plural sets of them are laid in parallel relations one another and supplied onto a rotating core with traverse in an axial direction of said core. At each end of the core, the hollow fibers are led back in such manner that the follow fibers of each set are not overlapped while maintaining their parallel relationship. Thus, the flat tape-form bundles constituted by the hollow fibers of plural sets are arranged in order around the core to form a package body. The sets of the hollow fibers to make each bundle are usually from 2 to 15, preferably from 3 to 10.

According to the present invention, the hollow fibers are dispersed appropriately without full overlapping at the turned-back portion. Accordingly, without causing buildup of the fibers at the end of the core, the hollow fibers can be arranged around the core from its one end to the other end uniformly and at a high packing density. Thus, the spaces between the hollow fibers are made small and uniform, and therefore a fluid can be led fast at a uniform flow rate without involving a standstill of flow. Due to a less tendency of causing the concentration polarization of fluid or of forming the precipitate or adhesion, the separation of fluid takes place uniformly and efficiently in the hollow fibers, and the efficiency of seaparation in the whole system is significantly improved.

In the above preparation of the package body, it is preferred to arrange the hollow fibers around the core while holding them at their turned-back portion by the aid of a string-like means and/or a band-like means. By this procedure, slipping at the turned-back portion can be prevented so that the fibers are accurately arranged to give a package body free from collapse of cross-winding. This is particularly effective when the angle of intersection of the bundles of hollow fibers in an axial direction of the core is smaller than 90°. Since a package body is producible without applying an unreasonable force such as tension or friction to the hollow fibers, any damage is not caused to the hollow fibers.

The present invention will be hereinafter explained with reference to the embodiments as shown in the accompanying drawings wherein.

Figure 1:
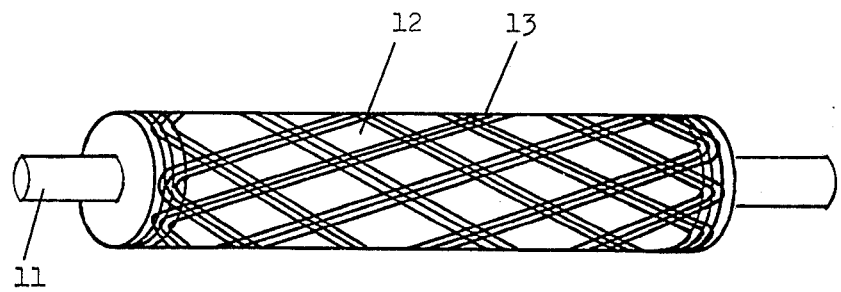
FIG. 1 is a perspective view of a hollow fiber package body according to one embodiment of the present invention.

In FIG. 1 bundles of hollow fibers (13) are arranged on the core (12) regularly and orderly in parallel relations one another without overlapping at the end of the core.

Figure 2:
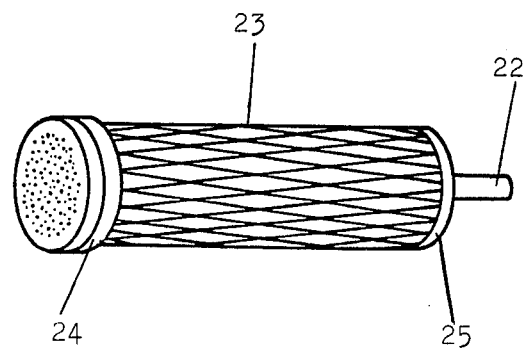
FIG. 2 is a perspective view of a hollow fiber package body according to another embodiment of the present invention.

The embodiment of FIG. 2 has been prepared by arranging hollow fibers around the core (22) to make multi-layers of hollow fibers (23), injecting, molding and curing a resin into both ends of the multilayers of hollow fibers to form the resin walls (24) and (25), and cutting the resin wall (24) nearly vertically to the core to provide an open end of the hollow fibers.

Figure 3:
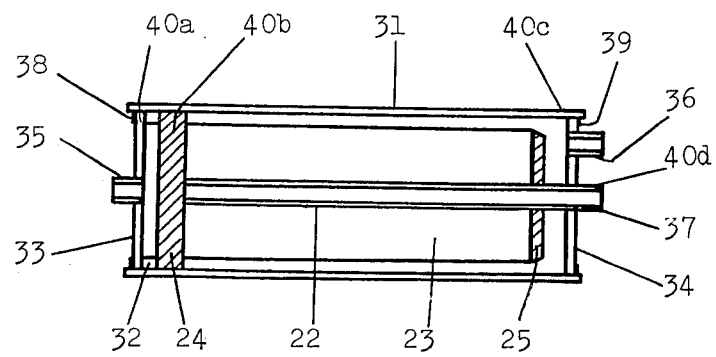
FIG. 3 is a cross-sectional view of an embodiment of the membrane separation apparatus according to the present invention.

FIG. 3 shows a cross-sectional view of an embodiment of the membrane separation apparatus according to the invention, which comprises a container and the hollow fiber package body as shown in FIG. 2 accommmodated in said container. That is, the package body comprising the core (22), the hollow fiber layers (23) surrounding the core and the resin walls (24) and (25) is accommodated in the cylindrical container (31). The core (22) has a slit-like opening on the portion in contact with the hollow fiber layer. On the side of the resin wall (24) there is disposed an end plate (33) interposed by the annular means (32). On the side of the resin wall (25) there is arranged an end plate (34). The end plate (33) is provided with a fluid entrance (35) communicating with the inside of the hollow fibers. The end plate (34) has the fluid outlet (36) and the fluid entrance (37) communicating with outside the hollow fibers. The end plates (33) and (34) are supported by the snaprings (38) and (39) set inside the container (31) and include the elastic rings (40a), (40b), (40c) and (40d) as the mechanism for sealing the fluid.

To explain the case of applying the membrane separation apparatus shown in FIG. 3 to a reverse osmosis process, the fluid to be treated is supplied to the fluid entrance (37) and flows through the core (22), passes through the slit and runs into the hollow fiber layers (23). While the fluid passes through the hollow fiber layers (23), a part of the fluid permeates through the membrane walls of the hollow fibers, the permeated fluid reaches the outside open end of the resin wall (24) through the flow route inside of the hollow fiber, passes through the chamber formed by the annular means (32) and flows out from the outlet (35). On the other hand, the treated fluid which passed through the hollow fiber layers (23) without permeating through the membrane walls of the hollow fibers is taken out from the outlet (36).

Figure 4:
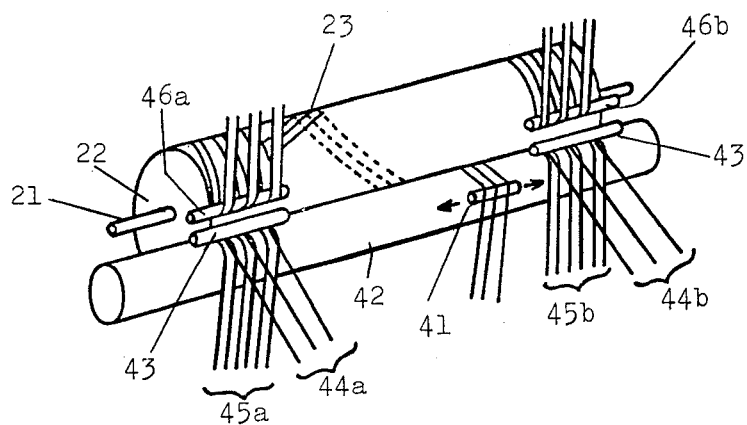
FIG. 4 is a perspective view illustrating an embodiment of the process for producing the hollow fiber package body of the present invention.

In FIG. 4, (21) is a center shaft for rotating the core (22); (23) is a bundle of hollow fibers arranged on the core (22); (41) is a traverse guide; (42) is a bale roller; (43) is a nip roller which rotates in contact with the bale roller; (44a) and (44b) are fixing strings for fixing the hollow fibers (23) at the end of the core (22); and (45a) and (45b) are endless belts for temporary fixation of the hollow fibers (23) at the end of the core (22). Said endless belt presses the hollow fibers (23) to the core (22) by the bale roller (42) and the bale reversing rollers (46a) and (46b).

Figure 5:
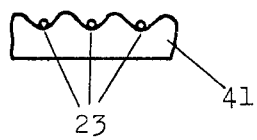
FIG. 5 is a detail view illustrating the transverse guide of FIG. 4.
Figure 6:
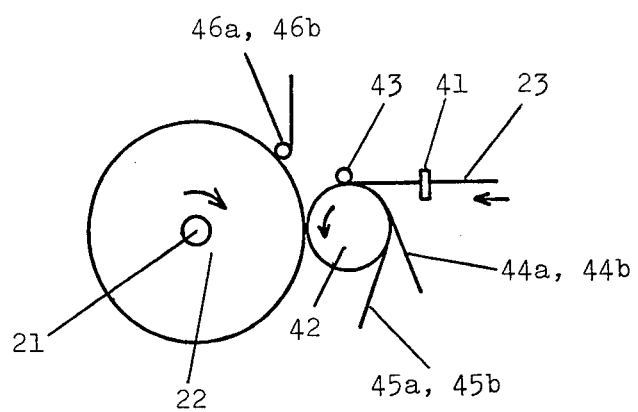
FIG. 6 is an end view of the embodiment of FIG. 4.
Figure 7:
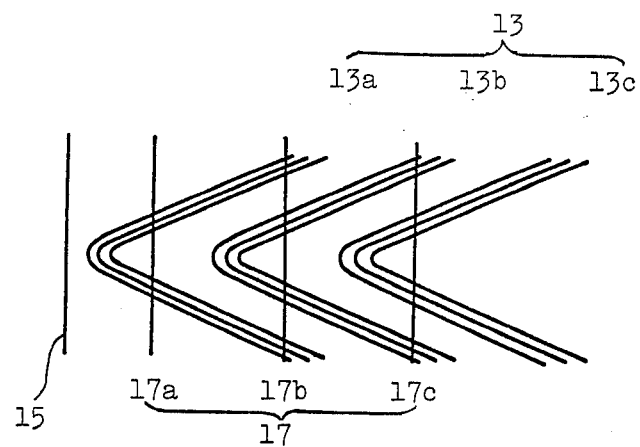
FIGS. 7 and 8 illustrate bundles of the hollow fibers fixed in a parallel state without overlap by fixing strings (FIG. 7) or one fixing string (FIG. 8).
Figure 8:
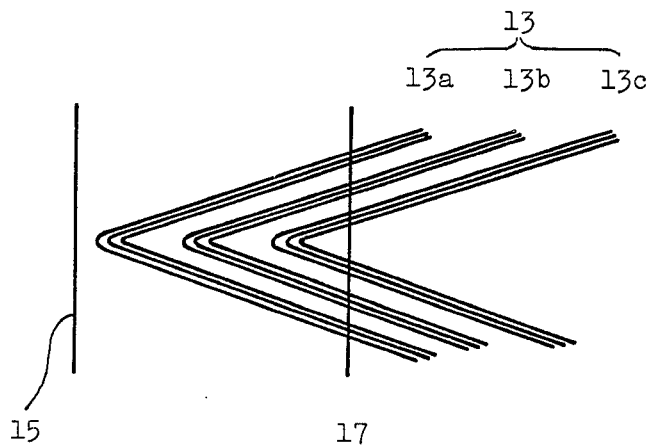

In FIG. 4, there is shown that plural sets of a piece of or plural hollow fibers are arranged to form a bundle of hollow fibers (23), which are divided into plural numbers with a traverse guide (41) (cf. FIG. 5), under which condition they are wound on the slowly rotating core (22). On the other hand, the fixed endless belts (45a) and (45b) provided at the two ends of the core (22) move along the surfaces of the bale roller (42), the core (22) and the bale reversing rollers (46a) and (46b). When the traverse guide (41) moves to the end of the core (22) and a bundle of the hollow fibers (23) is supplied to the end of the core (22), said bundle of the hollow fibers is held in the space between the fixed endless belts (45a) and (45b) and the core (22), and is caught by the fixing strings (44a) and (44b) which are wound at the end of the core (22), and the bundle of the hollow fibers (23) is fixed under a parallel state and is turned back. Accordingly, at the return of the traverse guide (41) to the central part of the core (22), the bundle of hollow fibers (23) which is fixed at the end is taken up without collapsing onto the core (22). The winding shapes of said hollow fiber bundle may be as shown in FIG. 1, 7 or 8 wherein the bundles of the hollow fibers (23a), (23b) and (23c) are fixed in a parallel state without causing any overlapping at the end (15) of the core (22) by the fixing strings (17a), (17b) and (17c), or by a piece of the fixing string (17) and are arranged regularly and uniformly.

The hollow fibers to be used in the present invention are not particularly limited, provided that they have an outer diameter of 10 to 1,000 microns and a hollow rate of 3 to 80%, and their membrane walls have a selective permeation property to fluid. The membrane walls of these hollow fibers may be either homogeneous, micro-, porous or anisotropic, and the spinning method of these fibers may be either melt spinning, wet spinning, dry spinning or combination of them. Examples of the materials to constitute the hollow fibers are cellulosic polymers (e.g. cellulose acetate, hydroxyethyl cellulose, cyanoethyl cellulose, regenerated cellulose), vinyl polymers (e.g. polyvinyl alcohol, polyvinyl acetal, polyacrylonitrile, polyacrylate, polyethylene, polypropylene, polystyrene, polyvinyl chloride, polytetrafluoroethylene), polyelectrolyte complex of polystyrene sulfonate-polyvinyl benzyltrimethyl ammonium, polyamides (e.g. poly-L-glutamate, nylon 4, nylon 6, nylon 66, polydimethylpiperazine fumaramide, polydimethylpiperazine isophthalamide, polydimethylpiperazine terephthalamide, polyparaxylylene adipamide, polyparaxylylene isophthalmaide, polyparaxylylene terephthalamide, polymethaphenylene isophthalmide, polyparaphenylene terephthalamide), polyhydrazide, polyamide hydrazide, polybenzylimidazole, polyimidazopyrrolon, polycarbonate, polyphenylene oxide, polysulfone, polyethylene terephthalate, polybutylene terephthalate, silicon resin, collagen, etc.

It is preferred that the core is a hollow cylindrical pipe or tube having uniform pores or a net-like cylindrical tube or pipe and is so constructed as to permit passage of a fluid therein. Alternatively, it may take a form of a core having a pentagonal cross-section so as to permit passage of a fluid in its space of the hollow fibers; a slit tube provided with a longitudinal slit-like opening(s); or a filled center rod such as a round bar, a square bar, or a bar-like matter having protrusions. Also, as the material for the core, there may be used plastics, metal, ceramics or the like.

The resin for constructing the resin wall is preferably in a fluid state before curing and forms a hard solid by curing. Typical examples are epoxy resins, silicon resins, polyurethane resins, etc. The resin wall may be provided at one end or at both ends of the hollow fiber package body perpendicularly to the axis thereof; the respective hollow fiber bundles are open outward thrusting through at least one of the resin walls and the space between the hollow fibers and the resin walls is sufficiently sealed against the fluid.

In the embodiments as illustrated above, the strings as well as the endless belts are used for fixing the fiber bundles. However, either one of these fixing means may be adopted. When either one of them is to be used, it is preferred to use a string-like means or a band-like means such as a string for permanently holding the hollow fiber bundles, as such means permits sufficient fixing of the hollow fiber bundles. It is of course preferred for assurance to hold the hollow fibers with an endless belt and then to hold them permanently by winding a string-like means or a band-like means. The string-like means for fixing may be strings, filaments, spun yarn or the like. The materials to be used may be of various kinds such as nylon, polyester, polyurethane, acryl resin, vinylon, cotton yarn and polypropylene. The band-like means may be tapes or the like. In any case, in order not to make the wound surface bulky, the use of a fine or a thin material is desired. Preferred sizes are, in the case of strings, 5 to 50 deniers, more preferably 20 to 30 deniers, and in the case of tapes, about 5 to 50 microns in thickness. It is not always necessary to hold each bundle of the fibers with a fixing string but the whole bundles may be held with a single fixing string as shown in FIG. 8. In other words, holding with an optional number of strings is allowable. Of course, in case of the holding with a band-like means such as a tape, a single band-like means may be used to cover the whole hollow fiber bundles for fixing. It is also allowable to use both the string-like means such as a string and the band-like means such as a tape.

The bale roller, the nip roller and the bale reversing rollers as shown in the above embodiments are preferably made of an iron roll covered on its surface with rubber, cloth, paper or any other material of less slippery quality. The nip roller is not essentially necessary, but preferably it should be provided in order to wind the fibers smoothly. In the embodiments as given, the bale reversing rollers and the nip rollers are provided independently at the two ends, but there may be provided a nip roller of a single body over the whole length of the core. Also, the bale roller is not necessarily disposed to be in contact with the bundle of the fibers at the central part of the core.

What is claimed is:

1. A hollow fiber package body for separation of fluid comprising a core and layers of hollow fibers having a selective permeability arranged around said core, said hollow fiber, layers being formed by tape-like bundles of hollow fibers said bundles composed of an arrangement of hollow fibers in nearly parallel relations to one another and in a flat state, said bundles having been turned back near the end of said package body while being held by at least one string or band, the width of each hollow fiber bundle being from 15 to 50,000 d (where d is the outer diameter of a hollow fiber) and the ratio of the thickness to the width of each hollow fiber bundle being from 1/20,000 to 1/5, said hollow fiber bundles being arranged in multi-layers by intersecting at least at one spot between one end and the other end of said package body, and said hollow fiber bundles being arranged in mutually and up- and downwardly intersecting relationships crossing two or more adjacent layers.

2. The hollow fiber package body according to claim 1 wherein the hollow fiber bundles are arranged around the core in multi-layers with intersections at an angle of intersection of 10° to 90° taken in the axial direction of said core.

3. The hollow fiber package body according to claim 1, which has a resin wall at least at one end with the hollow fibers thrusting through at least one resin wall.

4. A hollow fiber package body for separation of fluid comprising a core and layers of hollow fibers having a selective permeability arranged around said core, said hollow fiber layers being formed by tape-like bundles of hollow fibers, said bundles composed of an arrangement of hollow fibers in nearly parallel relations to one another and in a flat state, the width of each hollow fiber bundle being from 15 to 50,000d (where d is the outer diameter of a hollow fiber) and the ratio of the thickness to the width of each hollow fiber bundle being from 1/20,000 to 1/5, said bundles having been turned back near the end of said package body while being held by at least one string and said hollow fiber bundles being arranged in multilayers by intersecting at least at one spot between one end and the other end of said package body.

5. The hollow fiber package body according to claim 4, wherein the hollow fiber bundles are arranged around the core in multi-layers with intersections at an angle of intersection of 10° to 90° taken in the axial direction of said core.

6. The hollow fiber package body according to claim 4, wherein the hollow fiber bundles are arranged in mutually and up- and downwardly intersecting relations and are crossed two or more adjacent layers.

7. The hollow fiber package body according to claim 4, which has a resin wall at least at one end with the hollow fibers thrusting through at least one resin wall.

8. A membrane separation device comprising a tubular container having an entrance for fluid and a hollow fiber package body according to claim 1 accommodated in said container.

* * * * *